United States Patent
Kitada, I et al.

(10) Patent No.: US 8,896,853 B2
(45) Date of Patent: Nov. 25, 2014

(54) IMAGE FORMING APPARATUS, ACCELERATOR AND IMAGE FORMING METHOD

(75) Inventors: Takenori Kitada, I, Tokyo (JP); Kiyoshi Takagi, Tokyo (JP); Hitoshi Koyanagi, Tokyo (JP); Shinya Fujisawa, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 61 days.

(21) Appl. No.: 13/637,939

(22) PCT Filed: Jan. 24, 2011

(86) PCT No.: PCT/JP2011/051178
§ 371 (c)(1),
(2), (4) Date: Sep. 27, 2012

(87) PCT Pub. No.: WO2011/122079
PCT Pub. Date: Oct. 6, 2011

(65) Prior Publication Data
US 2013/0027735 A1    Jan. 31, 2013

(30) Foreign Application Priority Data

Mar. 29, 2010   (JP) ................. 2010-074337

(51) Int. Cl.
| G06F 3/12 | (2006.01) |
| G06K 15/00 | (2006.01) |
| H04N 1/40 | (2006.01) |
| H04N 1/60 | (2006.01) |
| G06K 15/02 | (2006.01) |
| G06T 1/20 | (2006.01) |

(52) U.S. Cl.
CPC ........ G06K 15/1857 (2013.01); G06K 15/1888 (2013.01); G06T 1/20 (2013.01)
USPC ............................. 358/1.13; 358/1.9; 358/2.1

(58) Field of Classification Search
None
See application file for complete search history.

(56) References Cited

U.S. PATENT DOCUMENTS

| 6,323,958 | B1* | 11/2001 | Shimizu ................. 358/1.9 |
| 6,490,055 | B1* | 12/2002 | Shimizu ................. 358/1.9 |
| 2005/0243374 | A1* | 11/2005 | Nishide et al. ............ 358/2.1 |
| 2009/0268251 | A1* | 10/2009 | Nishide ................. 358/2.1 |
| 2010/0254626 | A1* | 10/2010 | Yamaguchi et al. ........ 382/276 |

FOREIGN PATENT DOCUMENTS

| JP | 07-137353 | 5/1995 |
| JP | 2000-109898 | 4/2000 |
| JP | 2000-270233 | 9/2000 |
| JP | 2006-079475 | 3/2006 |
| JP | 2006-113672 | 4/2006 |
| JP | 2009-269179 | 11/2009 |

* cited by examiner

*Primary Examiner* — Marivelisse Santiago Cordero
*Assistant Examiner* — Moustapha Diaby
(74) *Attorney, Agent, or Firm* — Lucas & Mercanti, LLP (57) ABSTRACT

Disclosed is an image forming apparatus that makes it possible to suppress the scale enlargement of the electric circuit, so as to make the apparatus highly flexible. The apparatus forms an image based on image data acquired by applying a rendering operation to depiction commands and includes: a converting section to convert input data to the depiction commands; a first rendering section to apply the rendering operation to a first depiction command; a second rendering section to apply the rendering operation to a second depiction command; a reading section to read out first information from the storage section; a determining section to determine whether the first rendering section or the second rendering section should apply the rendering operation to each of the depiction commands; and a control, section to make either the first rendering section or the second rendering section apply the rendering operation to each of the depiction commands.

11 Claims, 5 Drawing Sheets

| DEPICTION COMMAND | |
|---|---|
| KIND OF OBJECT | IMAGE |
| | CHARACTER |
| | FIGURE |
| | GRADATION |
| KIND OF IMAGE PROCESSING | OVERWRITE PROCESSING |
| | ROP PROCESSING |
| | TRANSPARENT OVERLAY PROCESSING |

FIG. 5

| CONTROL SECTION (SOFTWARE PROCESSING SECTION) |
|---|
| GRADATION |
| TRANSPARENT OVERLAY PROCESSING |

| ACCELERATOR (HARDWARE PROCESSING SECTION) |
|---|
| IMAGE |
| CHARACTER |
| FIGURE |
| OVERWRITE PROCESSING |
| ROP PROCESSING |

FIG. 6

| | IMAGE | CHARACTER | FIGURE | GRADATION |
|---|---|---|---|---|
| OVERWRITE PROCESSING | 0 | 0 | 0 | 1 |
| ROP PROCESSING | 0 | 0 | 0 | 1 |
| TRANSPARENT OVERLAY PROCESSING | 1 | 1 | 1 | 1 |

FIG. 7

|  | IMAGE | CHARACTER | FIGURE | GRADATION |
|---|---|---|---|---|
| OVERWRITE PROCESSING | 0 | 0 | 0 | 0 |
| ROP PROCESSING | 0 | 0 | 0 | 0 |
| TRANSPARENT OVERLAY PROCESSING | 0 | 0 | 0 | 0 |

IMAGE FORMING APPARATUS, ACCELERATOR AND IMAGE FORMING METHOD

CROSS REFERENCE TO RELATED APPLICATIONS

This is a 371 of PCT/JP2011/051178 filed. Jan. 24, 2011, which claimed the priority of Japanese Application No JP2010-074337 filed Mar. 29, 2010, both Applications are incorporated herein by reference.

FIELD OF TILE INVENTION

The present invention, relates to an image forming apparatus, an accelerator and an image forming method.

TECHNICAL BACKGROUND

There has been well-known an MFP (Multi-Functional Peripheral) that is provided with various kinds of functions, including a printing function, a copy function, a facsimile function, etc. The MFP is coupled to a plurality of computers through a network. Each of the users, who currently uses each of the computers, transmits data (Page Description Language), representing a document or the like created by using the computer concerned, to the MFP through the network. Receiving the Page Description Language, the MFP parses the Page Description Language concerned so as to create a depiction command, and then, conducts rendering (image depiction processing) based on the depiction command above-created, so as to output a printed paper sheet onto which a formed image is fixed.

Rendering can be implemented by processing hardware and/or processing software, both provided in the MFP concerned. For instance, conventionally well-known is such a printing apparatus that is provided with a plurality of image depicting sections, each of which performs an image depicting operation by using the processing hardware, and another plurality of image depicting sections, each of which performs an image depicting operation by using the processing software, and that makes the both kinds of image depicting sections implement the image depiction processing in parallel so as to improve the processing velocity faster than ever (for instance, set forth in Patent Document 1).

The printing apparatus, set forth in Patent Document 1, sorts the processing into the processing hardware and the processing software, while detecting the loading status of the processing software. On an occasion of sorting the processing, the printing apparatus gives a priority to the processing hardware so as to make the high-speed depiction processing possible. Accordingly, it becomes possible to shorten the process time to be consumed before the printing operation is actually started, resulting in an improvement of the printing velocity.

Further, still conventionally well-known is such a print controlling apparatus that is provided with a rendering section, which performs rendering by using the processing hardware, and another rendering section, which performs rendering by using the processing software, and that categorizes the depiction commands into those to be processed by the processing hardware and others to be processed by the processing software, so as to implement the processing of each of the depiction commands, corresponding to the level of the depiction command concerned (for instance, set forth in Patent Document 2).

In the print controlling apparatus set forth in Patent Document 2, a high-quality rendering operation is performed by the processing hardware, and accordingly, the processing software, serving as a subsidiary function of the processing hardware, does not perform such a high-quality rendering operation that is equivalent to that to be performed by the processing hardware.

PRIOR ART DOCUMENT

Patent Document

Patent Document 1: Tokkai 2009-269179 (Japanese Patent Application Laid-Open Publication)
Patent Document 2: JP-2875725 (Japanese Patent Gazette)

SUMMARY OF THE INVENTION

Subject to be Solved by the Invention

However, in order to allot a processing to either the processing hardware or the processing software while referring to the loading statuses of them as described in Patent Document 1, it is necessary to configure the system so that both the processing hardware and the processing software can process the same object. In other words, if neither the processing hardware nor the processing software has the ability of processing all of the objects to be instructed by the depiction commands, the processing would be delayed and stuck. Further, there has been such a problem that, in order to make all of the objects processable, a large scale electric circuit should be provided for the processing hardware, resulting in the steep rise of the manufacturing cost thereof.

Further, in order to categorize the processing, corresponding to the level of the depiction command concerned, as described in Patent Document 2, it is necessary to determine in advance those to be processed by the processing hardware and others to the processed by the processing software. As a result, the flexibility of the system concerned has been lost, and it has been virtually impossible to easily replace the processing hardware to an update one. In addition, there has been such a problem that it is also necessary to update the software to be executed for allotting the processing, corresponding to the processing hardware to be employed, resulting in the steep rise of the updating cost thereof.

Accordingly, the present invention is achieved to overcome the abovementioned problems. One of objects of the present invention is to provide an image forming apparatus, an accelerator and an image forming method, each of which makes it possible to suppress the scale enlargement of the electric circuit to be employed for the processing hardware, makes it unnecessary to update the processing software for allotting the processing, corresponding to the change of the processing hardware, and makes the system highly flexible.

Means for Solving the Subject

The invention recited in Item 1 is characterized in that, in an image forming apparatus that applies rendering operation to depiction commands acquired by parsing data written in a Page Description Language, the image forming apparatus is provided with:

converting means for parsing inputted data written in the Page Description Language and converting to the depiction commands;

first rendering means for applying the rendering operation to the depiction commands by hardware processing means;

second rendering means for applying the rendering operation to the depiction commands by software processing means;

storing means for storing information in regard to depiction commands to which the rendering operation is can be applied by the first rendering means;

rendering means for reading the information in regard to the depiction commands stored in the storing means;

determining means for determining whether the first rendering means or the second rendering means should apply the rendering operation to the depiction command, based on the information in regard to the depiction commands, read by the reading means; and controlling means for making the rendering means, determined by the determining means, apply the rendering operation to the depiction command.

The invention recited in Item 2 is characterized in that, in the image forming apparatus recited in Item 1, the image forming apparatus is further provided with:

creating means for creating determining information representing a result of whether the first rendering means or the second rendering means should apply the rendering operation to the depiction command, and based on the determining information created by the creating means, the controlling means makes any one of the first rendering means and the second rendering means implement the rendering operation.

The invention recited in Item 3 is characterized in that, in the image forming apparatus recited in Item 2, the image forming apparatus is further provided with:

adding means for adding the determining information, created by the creating means, to the depiction command.

The invention recited in Item 4 is characterized in that, in the image forming apparatus recited in any one of Items 1-3, the hardware processing means is provided with the storing means.

The invention recited in Item 5 is characterized in that, in the image forming apparatus recited in any one of Items 1-4, the information in regard to the depiction commands varies depending on a processing capability of the hardware processing means.

The invention recited in Item 6 is characterized in that, in the image forming apparatus recited in any one of Items 1-5, the information in regard to the depiction commands includes information in regard to kinds of objects.

The invention recited in Item 7 is characterized in that, in the image forming apparatus recited in Item 6, the information in regard to the kinds of the objects includes an image, a character, a figure and a gradation.

The invention recited in Item 8 is characterized in that, in the image forming apparatus recited in any one of Items 1-7, the information in regard to the depiction commands includes information in regard to kinds of image processing operations.

The invention recited in Item 9 is characterized in that, in the image forming apparatus recited in Item 8, the information in regard to the kinds of the image processing operations includes an overwrite processing, a ROP processing and a transparent overlay processing.

The invention recited in Item 10 is characterized in that, in the image forming apparatus recited in any one of Items 1-9, the determining means determines whether the first rendering means or the second rendering means should implement the rendering operation in a unit of a page or in a unit of a band.

The invention recited in Item 11 is characterized in that, in an accelerator that is employed as hardware processing means to apply rendering operation to depiction commands so as to form an image, the accelerator is provided with storing means to store information in regard to depiction commands to which the accelerator itself can apply the rendering operation.

The invention recited in Item 12 is characterized in that, in an image forming method for forming an image by employing an image forming apparatus that stores information in regard to depiction commands to which a rendering operation can be applied by using hardware processing means, and by applying the rendering operation to the depiction commands, acquired by parsing data written in a Page Description Language, by means of the hardware processing means or software processing means, the image forming method comprises the steps of:

parsing input data written in the Page Description Language so as to convert the input data to depiction commands;

reading information in regard to the depiction commands;

determining whether the hardware processing means or the software processing means should apply the rendering operation to the depiction commands, based on the depiction commands read in the reading step; and applying the rendering operation to the depiction commands by means of the processing means determined in the determining step.

Effect of the Invention

According to the invention recited in Item 1, the converting means parses the input data written in the Page Description Language so as to convert the input data to the depiction commands. Further, the storing means stores the information that relates to the depiction commands to which the first rendering means can apply the rendering operation, therein, and further, the reading means reads out the information in regard to the depiction commands stored in the storing means. Successively, based on the information in regard to the depiction commands concerned, the determining means determines whether the first rendering means or the second rendering means should implement the rendering operation in regard to the depiction commands concerned. Still successively, according to the determining result determined by the determining means, the control means makes either the first rendering means or the second rendering means implement the rendering operation in regard to the depiction commands concerned.

According to the abovementioned process, since the reading means reads out the information in regard to the depiction commands from the storing means, it becomes possible to categorize the depiction commands to be processed by the rendering operation. In other words, it becomes possible to sort the depiction commands into a group or depiction commands to be processed by the first rendering means and another group of those to be processed by the second rendering means, depending on the processing capability of the first rendering means.

Accordingly, it becomes unnecessary to configure the system so as to make both the first rendering means and the second rendering means possible to process the same object, and as a result, it becomes possible to suppress the circuit scale expansion of the hardware processing means for making the first rendering means perform the rendering operation. Therefore, it becomes applicable that the hardware processing means makes the storing means store only such depiction commands that are preferable for the hardware processing means to efficiently implement the rendering operation.

Further, even when the information in regard to the depiction commands, stored in the storing means, is updated, since the determining means can sort the depiction commands into the group to be processed by the first rendering means and the other group to be processed by the second rendering means, it becomes unnecessary to update the software to be executed for implementing the sort processing, corresponding to the update of the hardware processing means, resulting in realization of an image forming apparatus having a highly flexible performance. In other words, it becomes unnecessary to fix the group of depiction commands to be processed for implementing the rendering operation by the hardware processing means and the other group of depiction commands to be processed for implementing the rendering operation by the software processing means, but it becomes possible to update each of the groups concerned in a flexible way.

According to the invention recited in Item 2, by making the reacting means create the determining information in advance, it becomes unnecessary to determine whether the first rendering means or the second rendering means should implement rendering operation for every depiction command at the time of implementing the rendering operation.

Accordingly, it becomes possible to hasten the implementation of the rendering operation.

According to the invention recited in Item 3, since the adding means can generate a single batch of data including the determining information corresponding to each of the depiction commands by adding the determining information to the depiction commands, it becomes possible to make the data management operation easy.

According to the invention recited in Item 4, by making the accelerator provided with the storing means, it becomes unnecessary to provide another storing means separately, resulting in reduction of the number of parts to be employed.

According to the invention recited in Item 5, since the information in regard to the depiction commands varies depending on the processing capability of the hardware processing means, it becomes possible to implement the rendering operation with a high processing efficiency.

According to the invention recited in Items 6, 7, since any one of the first rendering means or the second rendering means can be selected as a currently suitable depiction section, depending on the kind of the object, it becomes possible to implement the rendering operation with a high processing efficiency.

According to the invention recited in Items 8, 9, since any one of the first rendering means or the second rendering means can be selected as a currently suitable depicting section, depending on the kind of the image processing, it becomes possible to implement the rendering operation with a high processing efficiency.

According to the invention recited in Item 10, since it becomes possible to determine whether the first rendering means or the second rendering means should implement the rendering operation in a unit of a page or in a unit of a band, it becomes possible to hasten the processing for implementing the image forming operation.

According to the invention recited in Item 11, by employing an accelerator as the hardware processing means, it becomes possible to alleviate the burden for implementing other processing in the consecutive processing to the conducted by the image forming apparatus.

Further, by providing the storing means into the accelerator, it becomes unnecessary to provide another storing means separately, resulting in reduction of the number of parts to be employed.

According to the invention recited in Item 12, the image forming apparatus parses the input data written in the Page Description Language so as to convert the input data to the depiction commands. The image forming apparatus stores the information in regard to the depiction commands to which the rendering operation can be applied by using the hardware processing means, and reads the information in regard to depiction commands stored therein. Based on the information above-read in regard to depiction commands, the image forming apparatus determines whether the hardware processing means or the software processing means should apply the rendering operation to the depiction commands. Then, the image forming apparatus makes the determined processing means apply the rendering operation to the depiction commands.

According to the abovementioned process, by reading out the information in regard to the depiction commands, it becomes possible to categorize the depiction commands to be processed by the rendering operation. In other words, it becomes possible to sort the depiction commands into a group of depiction commands to be processed by the hardware processing means and another group of those to be processed by the software processing means, depending on the processing capability of the hardware processing means.

Accordingly, it becomes unnecessary to configure the system so as to make both the hardware processing means and the software processing means possible to process the same object, and as a result, it becomes possible to suppress the circuit scale expansion of the hardware processing means for making the first rendering means perform the rendering operation. Therefore, it becomes applicable that the hardware processing means makes the storing means store only such depiction commands that are preferable for the hardware processing means to efficiently implement the rendering operation.

Further, even when the information in regard to the depiction commands, stored in the storing means, is updated, since the determining means can sort the depiction commands into the group to be processed by the hardware processing means and the other group to be processed by the software processing means, it becomes unnecessary to update the software to be executed for implementing the sort processing, corresponding to the update of the hardware processing means, resulting in realization of an image forming apparatus having a highly flexible performance. In other words, it becomes unnecessary to fix the group of depiction commands to be processed for implementing the rendering operation by the hardware processing means and the other group of depiction commands to be processed for implementing the rendering operation by the software processing means, but it becomes possible to update each of the groups concerned in a flexible way.

BEST MODE FOR IMPLEMENTING THE INVENTION

Referring to the drawings, an image forming apparatus, an accelerator and an image forming method, each embodied in the present invention will be detailed in the following.

Configuration of Image Forming Apparatus

Figure 1:
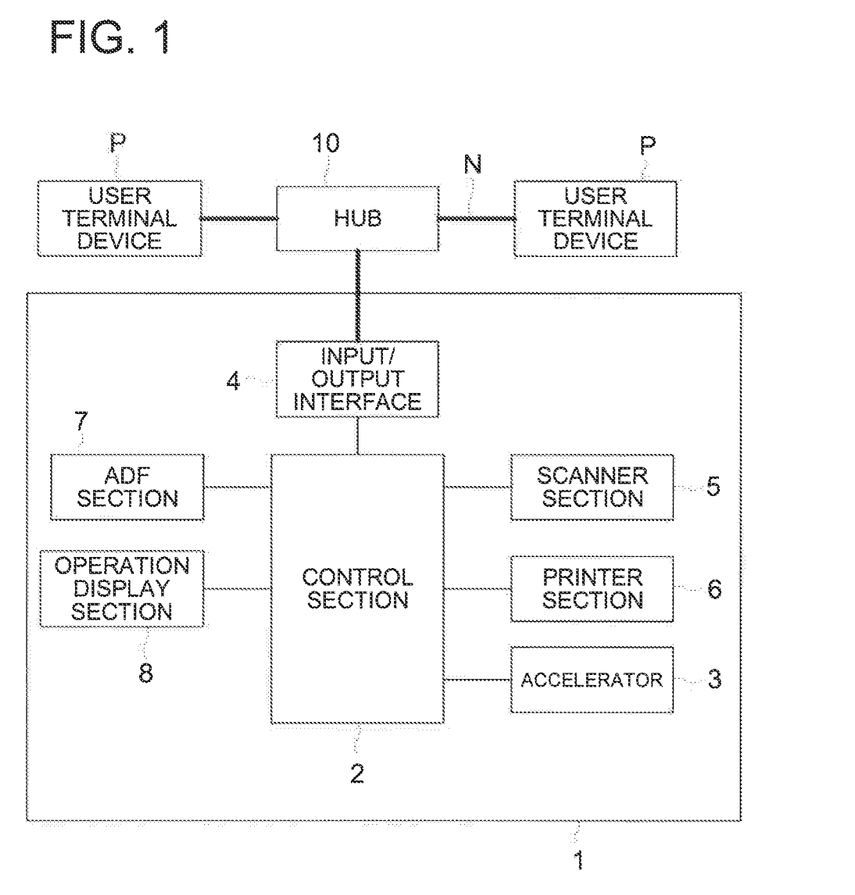
FIG. 1 is a block diagram indicating a brief configuration of an image forming system.

As shown in FIG. 1, an image forming apparatus 1 serves as an MFP (Multi-Functional Peripherals) that is provided with a scanner function, a copy function and a printer function. The image fencing apparatus 1 is coupled to a network N through a hub 10. Further, the image forming apparatus 1 is coupled to a plurality of user terminal devices P through the network N. Concretely speaking, the image forming apparatus 1 receives PDL data (data written in the Page Description Language to be used for an image forming operation), and implements the rendering operation (image depiction processing) based on the depiction command acquired by parsing the PDL data above-received, so as to create image data representing an image to be printed.

As shown in FIG. 1, the image forming apparatus 1 is constituted by a control section 2, an accelerator 3, an input/output interface 4, a scanner section 5, a printer section 6, an ADF (Automatic Document Feeder) section 7 and an operation display section 8.

Control Section

The control section 2 is provided with a CPU (Central Processing Unit), a ROM (Read Only Memory), a RAM (Random Access Memory), a storage section, etc., which are conventionally well-known.

Figure 2:
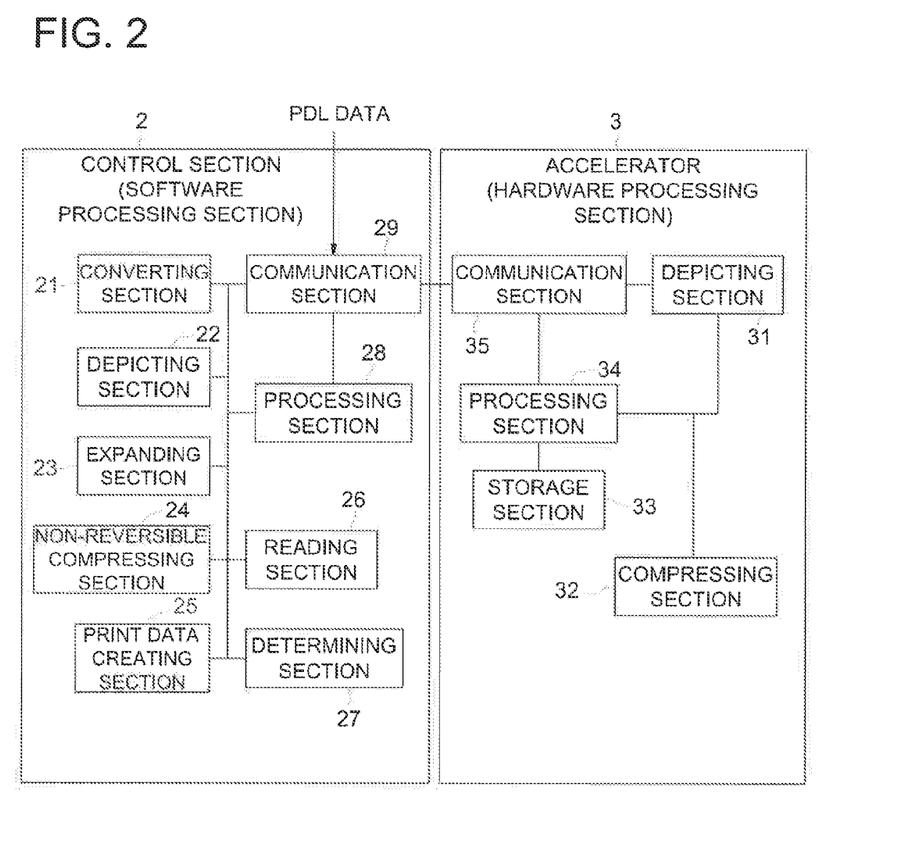
FIG. 2 is a block diagram indicating a brief configuration of a control section and an accelerator.

As shown in FIG. 1 and FIG. 2, the control section 2 receives PDL data (written in the Page Description Language) to be used for the printing operation, from one of the user terminal devices P coupled to the network N, through the input/output interface 4. The control section 2 transmits print data, created from the PDL data, to the printer section 6.

The control section 2 is coupled to the accelerator 3.

The control section 2 is provided with a convening section 21, a depicting section 22, an expanding section 23, a not compressing section 24, a print data creating section 25, a reading section 26, a determining section 27, a processing section 28 and a communication section 29.

The converting section 21 parses the PDL data received from the hub 10 so as to convert the PDL data to the depiction commands. In other words, the converting section 21 serves as a converting measure. In this connection, the depiction commands are such information that is necessary for the depicting section 22 or another depicting section 31, detailed later, to develop them to image data, and includes, for instance, kinds of objects (an image, a character, a figure, a gradation, etc.), sizes, colors, shapes, positional coordinate values, complication degrees of processing (number of arithmetic calculations to be repeated, etc.), kinds of image processing (an overwrite processing, an ROP processing, a permeabilize processing, etc.), units of rendering operations (for instance, in a unit of page, in a unit of band, in a unit of depiction command, etc.), etc.

The depicting section 22 makes the control section 2, serving as processing software measure, apply the rendering to the depiction commands converted by the converting section 21. Concretely speaking, the CPU (Central Processing Unit) included in the control section 2 executes the software in regard to the rendering operation so as to implement the rendering, in other words, the depicting section 22 serves as a second rendering measure.

The expanding section 23 expands the image data compressed by the accelerator 3.

The non-reversible compressing section 24 applies a non-reversible compression processing to image data as a pre-stage processing to be conducted before the image data is converted to the print data.

The print data creating section 25 creates print data to be transmitted to the printer section 6.

The reading section 26 reads the information in regard to the depiction commands stored into a storage section 33 provided in the accelerator 3. In other words, the reading section 26 serves as a reading measure. In this connection, in addition to the information in regard to the depiction commands abovementioned, the information in regard to the depiction commands also includes such information that relates to the processing ability of the accelerator 3 (such as a high speed processing, a low speed processing, etc.). The information in regard to the processing ability of the accelerator 3 serves as an indicator for determining which depiction command is to be rendering-processed by the accelerator 3.

Based on the information in regard to the depiction commands read by the reading section 26, the determining section 27 determines whether the depicting section 22 of the control section 2 or the depicting section 33 of the accelerator 3 should implement the rendering operation in regard to the concerned depiction command.

The processing section 28 conducts controlling operations of each of the sections included in the control section 2.

The processing section 28 transmits a command signal to any one of the depicting section 22 and the depicting, section 31, determined by the determining section 27, so as to apply the rendering operation to the depiction command concerned. In other words, the processing section 28 serves as a controlling measure.

Based on the judgment determined by the determining section 27, the processing section 28 creates judgment information representing the determination whether the depicting section 22 of the control section 2 or the depicting section 33 of the accelerator 3 should implement the rendering operation in regard to the concerned depiction command. In other words, the processing section 28 serves as a creating measure.

The processing section 28 adds the judgment information, above-created, to the depiction command, currently converted by the converting section 21. In other words, the processing section 28 serves as an adding measure. Concretely speaking, the crow sung section 28 flags "0" onto the depiction command to be processed by the depicting section 31, while flags "1" onto the other depiction command to be processed by the depicting section 22. By adding the judgment information to the depiction command as above-mentioned, it becomes possible for the determining section 27 to easily determine whether the depicting section 22 or the depicting section 33 should implement the rendering operation in regard to the depiction command concerned, basal on the flag serving as the judgment information.

The communication section 29 is coupled to both the hub 10 and the accelerator 3.

The communication section 29 receives the PDL data sent from the hub 10.

The communication section 29 transmits the depiction command, currently converted by the converting section 21, to the accelerator 3, so as to make the depicting section 31 apply the rendering operation to the depiction command concerned.

The communication section 29 receives the image data, created by applying the rendering operation, from the accelerator 3.

The communication section 29 transmits print data, created by the print data creating section 25, to the printer section 6.

The control section 2 reads out various kinds of processing programs, such as system programs, image forming/processing programs, paper-sheet ejection processing programs, etc., stored in the ROM (Read Only Memory), and develops them into the RAM (Random Access Memory), so as to implement the centralized controlling operations for controlling each of the sections included in the image forming apparatus 1 according to the programs currently developed in the RAM. Further, the storage section stores information in regard to preview images to be created and employed for displaying various kinds of setting information established by the user's inputting operations performs through the operation display section 8, therein.

For instance, the CPU (Central Processing Unit) creates a job based on the data (image information) inputted from the scanner section 5 and the setting information inputted through the operation display section 8. Then, the CPU implements the job concerned so as to form an image onto the paper sheet.

In this connection, hereinafter, the term of "job" is defined as a series of consecutive operations in respect to a unit image forming task. For instance, when the user intends to make a copy from a document constituted by plural paper sheets, the series of consecutive operations in respect to the copying task for making a single copy of the document constituted by the plural paper sheets is a job above-defined. On the other hand, when the user intends to make a plurality of copies from a document constituted by plural paper sheets, the series of consecutive operations in respect to the copying task for making the plurality of copies of the document constituted by the plural paper sheets is a job above-defined.

Accelerator

As shown in FIG. 1 and FIG. 2, the accelerator 3 is coupled to the control section 2.

The accelerator 3 is provided with the depicting section 31, a compressing section 32, the storage section 33, a processing section 34 and a communication section 35.

The depicting section 31 makes the processing hardware measure apply the rendering to the depiction commands converted by the converting section 21. Concretely speaking, the accelerator 3, serving as the processing hardware measure, implements the rendering. In other words, the depicting section 31 serves as a first rendering measure.

Before transmitting the image data, generated by applying the rendering operation, to the control section 2, the compressing section 32 applies a compression processing to the image data concerned. Various kinds of compression methods are available, and an optimum compression method is selected from the compression methods above-provided, corresponding to the capacity of the image data concerned and the presence or absence of the re-rendering operation.

The storage section 33 stores information that relates to the depiction commands to which the depicting section 31 of the accelerator 3 can apply the rendering operation, therein. In other words, the storage section 33 serves as a storage measure. As described in the above, since the storage section 33 stores only such the information that relates to the depiction commands to which the depicting section 31 of the accelerator 3 can apply the rendering operation, therein, the depicting section 22 of the control section 2 applies the rendering operation to all of the depiction commands that are not stored in the storage section 33.

The processing section 34 conducts controlling operations for controlling each of the sections included in the accelerator 3.

The communication section 35 is coupled to the control section 2.

The communication section 35 receives the depiction commands converted by the converting section 21 of the control section 2.

The communication section 35 transmits the image data, generated by applying the rendering operation in the depicting section 31, to the control section 2.

Input/Output Interface

The input/output interface 4 serves as an interface to couple the control section 2 to various kinds of external input/output apparatuses, and is coupled to the hub 10 and the control section 2.

The input/output interface 4 receives the PDL data sent from each of the plurality of user terminal devices P (such as a personal computer, etc.), and then, transmits the PDL data above-received to the control section 2.

Scanner Section

As shown in FIG. 1, the scanner section 5 is provided with an image sensor, such as a CCD (Charge Coupled Device), etc., and a scanner controlling section. Based on the controlling signals sent from the control section 2, the scanner controlling section controls the driving operations to be performed in each of the sections provided in the scanner section 5. Concretely speaking, the scanner controlling section controls the implementation of the exposure scanning operation for scanning a light beam onto the document, which is currently placed onto the contact glass (platen glass), so as to read an image from the reflected light projected onto the image sensor. Successively, the scanner controlling section controls the opt-electric converting actions, so as to convert intensities of the reflected light projected onto the image sensor to analogue image signals, and then, transmits the analogue image signals to the control section 2.

Printer Section

As shown in FIG. 1, the printer section 6 is provided with an LD (Laser Diode) section and a printer controlling section. The printer section 6 forms an image onto a paper sheet, based on the image data inputted from the control section 2. In this connection, when the image data is transmitted horn one of the plurality of user terminal devices P to the image forming apparatus 1, the printer section 6 forms the image based on data received from the control section 2.

The LD section is provided with an LD (Laser Diode), a photoreceptor drum, an electric charging section, an exposing section, a developing section, a transferring section, a cleaning section, a fixing section, etc. In addition, the LD section is also provided with such a conveyance section that includes pairs of paper-sheet feeding rollers to convey the paper sheet along an inner conveyance path, a pair of registration rollers, various kinds of rollers including a pair of paper-sheet ejection rollers, a conveyance path switchover plate, a conveyance direction reversing section, etc. Under the controlling actions conducted by the printer controlling section, the conveyance section of the LD section picks up a paper sheet, designated in regard to the job concerned, from the paper sheet feeding tray, so as to feed it into the conveyance path, and conveys the paper sheet through the conveyance path. A plurality of sensors is disposed along the conveyance path of the LD section. Each of the plurality of sensors generates a detection signal every time when the paper sheet passes through it, and outputs the detection signal to the printer controlling section.

Receiving the controlling signals sent font the control section 2, the printer controlling section controls the operations to be implemented in each of the sections included in the LD section. Further, based on the detection signals detected by the plurality of sensors respectively disposed at various positions located along the conveyance path, the printer controlling section counts a number of paper sheets fed during every job implementation, so as to output the counted number to the control section 2.

Based on the instructions received from the printer controlling section, the printer section 6 makes the electric charging section electrically charge the circumferential surface of the photoreceptor drum, and then, based on the PWM (Pulse Width Modulation) signals inputted from the control section 2, makes the LD irradiate a laser beam onto the circumferential surface of the photoreceptor drum so as to form an electrostatic latent image thereon. Successively, the printer section 6 makes the developing section adhere toner onto the area including the electrostatic latent image formed on the circumferential surface of the photoreceptor drum so as to form a visible toner image thereon and then, makes the transfer-ring section transfer the visible toner image onto the paper sheet so as to form an image thereon. Still successively, the printer section 6 intakes the fixing section fix the image above-transferred onto the paper sheet concerned, and then, makes the pair of paper-sheet ejection rollers convey the paper sheet, on which the image is already formed, to a post processing section.

ADF Section

As shown in FIG. 1, the ADF section 7 is provided with an ADF (Automatic Document Feeder) controlling section that conducts the operations for controlling the ADF section 7. The ADF section 7 automatically conveys a single document paper sheet or a plurality of document paper sheets, placed on a document placing tray (not shown in the drawings), onto the contact glass of the scanner section 5, one by one.

Operation Display Section

As shown in FIG. 1, the operation display section 8 is provided with a displaying operation display controlling section, an operating section and a group of operation keys (not shown in the drawings).

According to the display controlling signals received from the operation display controlling section, the displaying section displays various kinds of setting screens, a status of current image, an operating status of each of various functions, etc., thereon. Further, an operating section that is provided with, for instance, a pressure-sensitive (resistance film pressure-sensitive type) touch panel in which transparent electrodes are arranged in a lattice pattern, etc., is mounted over the display surface of the displaying section, so as to detect X-Y coordinate electric values representing a pressure point depressed by a finger, a touch pen or the like, and the displaying section output the positional above-detected, to the operation display controlling section as the operational signals.

Image Forming Method to be Implemented by Image Forming Apparatus

Next, an image forming method to be implemented by the image limning apparatus 1 will be detailed in the following.

The image forming apparatus 1 commences the image forming operation at the time when the control section 2 receives PDL data from one of the user terminal devices P through the communication section 29.

Figure 3:
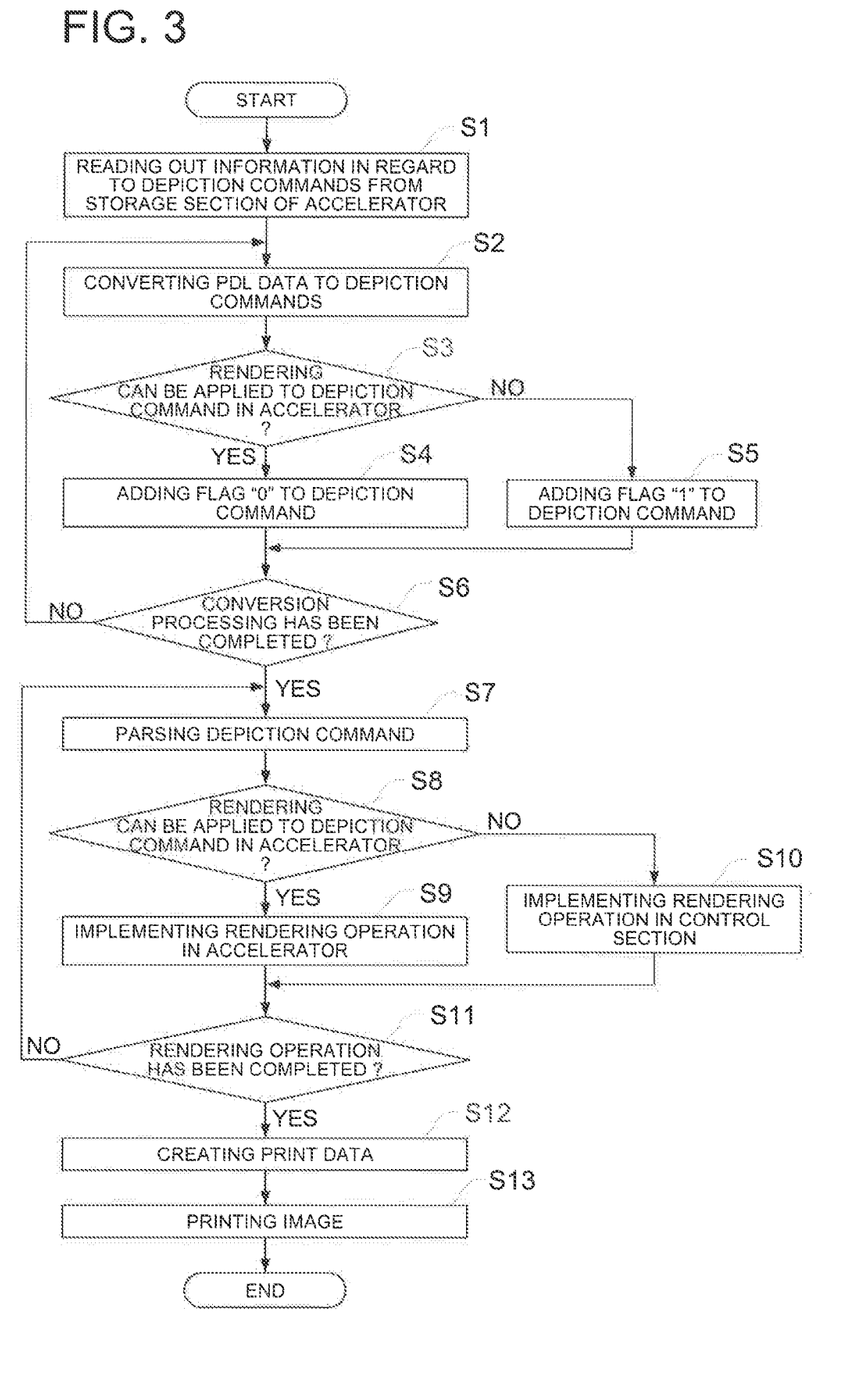
FIG. 3 is a flowchart indicating image forming processing to be conducted by an image terming apparatus.

As indicated in the flowchart shown in FIG. 3, at the time when the control section 2 receives the PDL data, the reading section 26 access the storage section 33 of the accelerator 3 so as to read out information in regard to the depiction commands concerned, therefrom (Step S1).

Successively, the converting section 21 parses the PDL data above-received so as to convert the PDL data to the depiction commands (Step S2).

Still successively, based on the information read out from the storage section 33, the determining section 27 determines whether or not the rendering can be applied to each of the depiction commands above-converted in the depicting section 31 of the accelerator 3 (Step S3).

Still successively, when the determining section 27 determines that the rendering can be applied to one of the depiction commands in the depicting section 31 of the accelerator 3 (Step S3: Yes), the processing section 28 adds a flag "0" (determination information), indicating that the rendering operation is to be implemented in the depicting section 31, to concerned one of the depiction commands (Step S4).

Still successively, when the determining section 27 determines that the rendering cannot be applied to one of the depiction commands in the depicting section 31 of the accelerator 3 (Step S3: No), the processing section 28 adds a flag "1" (determination information), indicating that the rendering operation is to be implemented in the depicting section 22, to concerned one of the depiction commands (Step S5).

In this connection, in regard to the processing from the operation for determining the depicting section, which actually applies the rendering to the depiction command concerned, to the operation for adding the flag, a concrete example will be cited and detailed in the following.

Figure 4:
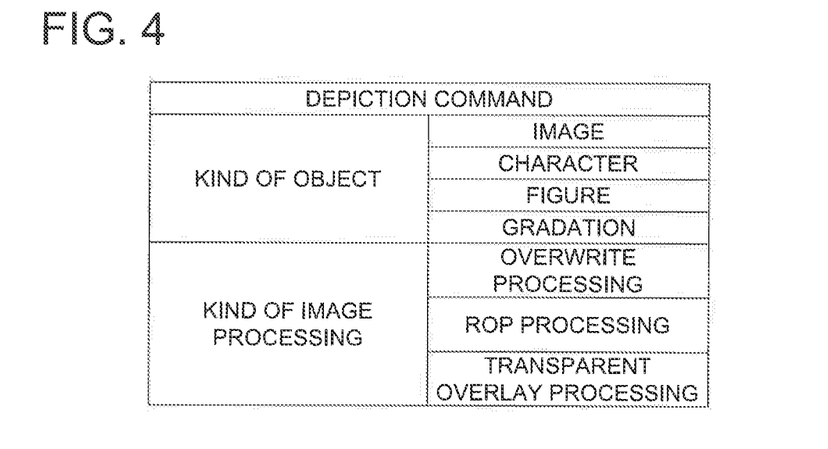
FIG. 4 is a drawing for explaining a depiction command.

For instance, as indicated in the table shown in FIG. 4, it is assumed that the depiction commands, converted by the converting section 21, include such information representing kinds of objects, such as an image, characters, a figure and a gradation, and such other information representing kinds of image processing operations such as an overwrite processing, a ROP processing and a transparent overlay processing.

Further, it is also assumed that the depiction commands to which the depicting section 31 can apply the rendering are an image, characters, a figure, an overwrite processing and a ROP processing, and which are currently stored in the storage section 33 of the accelerator 3.

Figure 5:
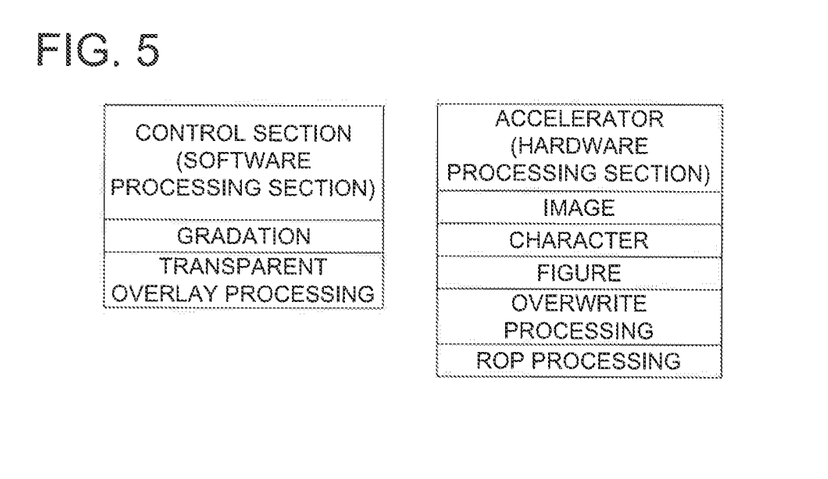
FIG. 5 is a drawing for explaining depiction commands to which depicting sections apply rendering operation, respectively.

In the above-assumed case, as indicated in the table shown in FIG. 5, the determining section 27 determines that the depicting section 31 of the accelerator 3 should apply the rendering to the depiction commands in regard to the image, the characters, the figure, the overwrite processing and the ROP processing, while the depicting section 22 of the control section 2 should apply the rendering to the other depiction commands in regard to the gradation, included in the information representing kinds of objects, and the transparent overlay processing.

Figure 6:
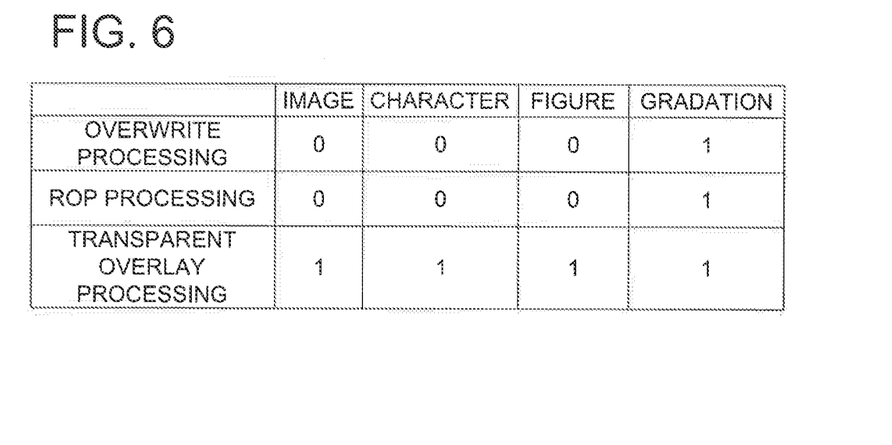
FIG. 6 is a drawing for explaining flags to be attached to depiction commands.

Successively, as indicated in the table shown in FIG. 6, the processing section 28 adds the nag "0" to a corresponding portion of each of the depiction commands of the image, the characters, the figure, the overwrite processing and the ROP processing, while adds the flag "1" to a corresponding portion of each of the depiction commands of the gradation and the transparent overlay processing Returning to the flowchart shown in FIG. 3, after the processing to be implemented in Step S4 or S5 is completed, the processing section 28 determines whether or not the conversion processing for converting the PDI, data to the depiction commands, which is to be implemented by the converting section 21, has been completed (Step S6).

Step S6, when determining that the conversion processing to be implemented by the converting section 21 has not been completed (Step S6: No), the processing section 28 makes the processing step return to Step S2.

In Step S6, when determining that the conversion processing to be implemented by the converting section 21 has been completed (Step S6: Yes), the processing section 28 reads the flag attached to the depiction command concerned (Step S7).

Successively, the determining section 27 determines whether the status of the flag above-read is "0" or "1" (step S8).

Still successively, when the determining section 27 determine that the status of the flag above-read is "0" (Step S3: Yes), the processing section 28 transmits an instruction signal to the depicting section 31 of the accelerator 3 so that the depicting section 31 implements the rendering operation based on the depiction command concerned (Step S9).

On the other hand, when the determining section 27 determine that the status of the flag above-read is "1" (Step S8: No), the processing section 28 transmits an instruction signal to the depicting section 22 of the control section 2 so that the depicting section 22 implements the rendering operation based on the depiction commend concerned (Step S10).

After the rendering operation has implemented in Step S9 or Step S10, the processing section 23 determines whether or not the depicting section 22 or 31 completes the rendering operation based on the depiction command concerned (Step S11).

In Step S11, when determining that depicting section 22 or 31 has not completed the rendering operation based on the depiction command concerned (Step S11; No), the processing section 28 makes the processing step return to Step S7.

In Step S11, when determining that depicting section 22 or 31 has completed the rendering operation based on the depiction command concerned (Step S11; Yes), the processing section 28 determines that the concerned rendering operation is finalized. Successively, the print data creating section 25 creates the print data based on the image data acquired by applying the rendering operation (Step S12), and then, based on the print data, the printer section 6 prints the image onto a recording medium, such as a paper sheet, etc., so as to output the printed recording medium (Step S13).

The image forming operation is conducted according to the processing described in the foregoing.

Features and Effects of Wage Forming Apparatus Embodied in the Present Invention According to the image forming apparatus 1 described in the foregoing, the converting section 21 parses the data written in the Page Description Language so as to convert it to the depiction commands. Further, the storage section 33 stores the information that relates to the depiction commands to which the depicting section 31 can apply the rendering operation, therein, and further, the reading section 26 reads out the information in regard to the depiction commands stored in the storage section 33. Successively, based on the information in regard to the depiction commands concerned, the determining section 27 determines whether the depicting section 31 or the depicting section 22 should implement the rendering operation in regard to the depiction commands concerned. Still successively, according to the determining result determined by the determining section 27, the processing section 28 makes either the depicting section 31 or the depicting section 22 implement the rendering operation in regard to the depiction commands concerned.

According to the abovementioned process, since the reading section 26 reads out the information in regard to the depiction commands from the storage section 33, it becomes possible to categorize the depiction commands to be processed by the rendering operation. In other words, it becomes possible to sort the depiction commands into a group of depiction commands to be processed by the depicting section 31 and another group of those to be processed by the depicting section 22, depending on the processing capability of the depicting section 31.

Accordingly, it becomes unnecessary to configure the system so as to make both the depicting section 31 and the depicting section 22 possible to process the same object, and as a result, it becomes possible to suppress the circuit scale expansion of the accelerator 3 for making the depicting section 31 perform the rendering operation. Therefore, it becomes applicable that the accelerator 3 makes the storage section 33 store only such depiction commands that are preferable for the accelerator 3 to efficiently implement the rendering operation.

Further, even when the information in regard to the depiction commands, stored in the storage section 33, is updated, since the determining section 27 can sort the depiction commands into the group to be processed by the depicting section 31 and the other group to be processed by the depicting section 22, it becomes unnecessary to update the software to be executed for implementing the sort processing, corresponding to the update of the accelerator 3, resulting in realization of an image forming apparatus having a highly flexible performance. In other words, it becomes unnecessary to fix the group of depiction commence to be processed for implementing the rendering operation by the accelerator 3, serving as the hardware, and the other goon of depiction commands to be processed for implementing the rendering operation by executing the software in the CPU, but it becomes possible to update each of the groups concerned in a flexible way.

Further, by making the processing section 28 create the determining information in advance, it becomes unnecessary to determine whether the depicting section 22 or the depicting section 31 should implement rendering operation for every depiction command at the time of implementing the rendering operation. Accordingly, it becomes possible to hasten the implementation of the rendering operation.

Still further, since the processing section 28 can generate a single batch of data including the determining information corresponding to each of the depiction commands by adding the determining information to the depiction commands, it becomes possible to make the data management operation easy.

Still further, by employing the accelerator as the hardware processing device, it becomes, possible to alleviate the burden for processing other operations among the consecutive operations to be conducted by the image forming apparatus 1.

Yet further, since the accelerator 3 is provided with the storage section 33, it becomes unnecessary to provide another storage device separately, resulted in reduction of the number of parts to be employed.

Yet further, since any one of the depicting section 22 and the depicting section 31 can be selected as a currently suitable depicting section, depending on the kind of the object and the kind of the image processing, it becomes possible to implement the rendering operation with a high processing efficiency.

Others

Incidentally, the scope of the present invention is not limited to the embodiment described ire the foregoing. Modifications and additions, made by a skilled person without departing from the spirit and scope of the invention, shall be included in the scope of the present invention.

Figure 7:
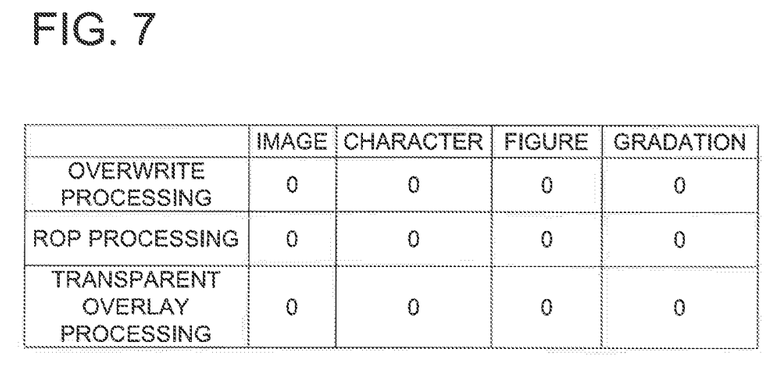
FIG. 7 is a drawing for explaining flags to be attached to depiction commands, when a high performance accelerator is employed.

For instance, when the accelerator is changed to a high-functional accelerator as a new one, it would become possible for the high-functional accelerator to implement the rendering operations based on all of the depiction commands. In that case, as shown in FIG. 7, the flag "0" is attached to all of the depiction commands. Accordingly, when the processing efficiency of the accelerator is updated, it is applicable that only the contents of data stored in the storage section provided in the accelerator are rewritten as needed.

According to the abovementioned, since the information in regard to the depiction commands differs corresponding to the processing efficiency of the accelerator, it becomes possible to implement the rendering operation with a high processing efficiency.

Further, although, in the embodiment described in the foregoing, the flag "1" or "0" is attached to every depiction command depending on the result of determining whether the depicting section 22 or the depicting section 31 should implements the rendering operation, it is also applicable that the abovementioned determination is made in a unit of a page or a runt of a band, defined as a predetermined range of area. According to the above, since not only a number of flags, but also a number of dines for implementing the abovementioned determining operations to be conducted at the time of the rendering, can be reduced, it becomes possible to hasten the image forming processing.

Still further, although, in the embodiment described in the foregoing, the information in regard to the depiction commands to which the accelerator applies the rendering operation is stored in the storage section, it is also applicable that each of the accelerators is made to store information in regard to its own efficiencies, such as a high functional capability, a standard capability, a cost reduction capability, etc., therein, while the control section stores the depiction commands, with which each of the accelerators can cope. In this case, after accessing each of the accelerators so as to determine the efficiencies of each of the accelerators, the control section reads out depiction commands therefrom, and classifies the depiction commands above-read into a group of depiction commands to be processed by the depicting section provided in the control section and another group of depiction commands to be processed by the other depicting section provided in the accelerator, so as to make them implement the rendering operations, respectively.

Yet further, the result of determining a depiction command, to which the accelerator should apply the rendering operation, varies depending on the circuit scale of the accelerator concerned.

For instance, such a rendering operation that is simply performed in a unit of pixel and includes no arithmetic calculation process as performed for an image object can be regarded as a processing suitable kin hardware since it is easy to design the hardware concerned, and it is possible to not only minimize the scale of the circuit concerned, but also achieve the cost reduction.

On the other hand, such another rendering operation that requires a lot of arithmetic calculations for the electronic transparent overlay processing, etc., can be regarded as a processing suitable for software, since, if hardware were employed for this purpose, the scale of the hardware concerned would be enlarged and the manufacturing cost would be skyrocketed.

Therefore, it is applicable that, if it is desired to employ such an accelerator that is manufactured at a low cost, such the accelerator that can cope with only the image object is selected, while, if it is desired to employ such an accelerator in which its efficiency weighs heavily, such the accelerator that can also cope with the rendering operation requiring a lot of arithmetic calculations for the electronic transparent overlay processing, etc., is selected.

Generally speaking, since the rendering operation can be performed at a higher processing rate by employing hardware, rather than by employing software, a high performance accelerator is employed in such a MFP (Multi-Functional Peripheral) model that requires a higher processing rate, while, a low performance accelerator is employed in such another MFP (Multi-Functional Peripheral) model that requires a cost reduction of the system concerned. Accordingly, it becomes possible for the user to select a suitable MFP (Multi-Functional Peripherals), corresponding to the object and/or the rank desired by the user.

EXPLANATION OF THE NOTATIONS 1 an image forming apparatus
2 a control section (software processing means)
3 an accelerator (hardware processing means)
21 a converting section (converting means)
22 a depicting section (second rendering means)
26 a reading section (reading means)
27 a determining section (determining means)
28 a processing section (controlling means, creating means, adding means)
31 a depicting section (first rendering means)
33 a storage section (storing means)

The invention claimed is:

1. An image forming apparatus that forms an image based on image data acquired by applying a rendering operation to depiction commands, which are derived from input data written in a Page Description Language by parsing the input data, the image forming apparatus comprising:
   a converting section to parse the input data written in the Page Description Language so as to convert the input data to the depiction commands;
   a first rendering section that includes a hardware processing unit to apply the rendering operation to a first depiction command, included in the depiction commands;
   a second rendering section that includes a software processing unit to apply the rendering operation to a second depiction command, included in the depiction commands;

a storage section to store first information including an a flag indicating a type of operation to be applied by the first rendering section based on a processing ability of the first rendering section;

a reading section to read out the first information in regard to the first depiction command from the storage section;

a determining section to determine whether the first rendering section or the second rendering section should apply the rendering operation to each of the depiction commands, based on the first information read by the reading section; and a control section to make either the first rendering section or the second rendering section apply the rendering operation to each of the depiction commands, according to corresponding one of results determined by the determining section.

2. The image forming apparatus of claim 1, further comprising:

a processing section to create determining information representing the results of determining whether the first rendering section or the second rendering section should apply the rendering operation to each of the depiction commands;

wherein the control section makes either the first rendering section or the second rendering section apply the rendering operation to each of the depiction commands, based on the determining information created by the processing section.

3. The image forming apparatus of claim 2, wherein the processing section further adds the determining information created by the processing section to each of the depiction commands.

4. The image forming apparatus of claim 1, wherein the hardware processing unit is provided with the storage section.

5. The image forming apparatus of claim 1, wherein the first information varies depending on a processing capability of the hardware processing unit.

6. The image forming apparatus of claim 1, wherein the first information includes second information in regard to kinds of objects.

7. The image forming apparatus of claim 6, wherein the kinds of the objects include an image, a character, a figure and a gradation.

8. The image forming apparatus of claim 1, wherein the first information includes third information in regard to kinds of image processing operations.

9. The image forming apparatus of claim 8, wherein the kinds of the image processing operations include an overwrite processing, a ROP processing and a transparent overlay processing.

10. The image forming apparatus of claim 1, wherein the determining section also determines whether the rendering operation should be implemented in a unit of a page or in a unit of a band.

11. A method for forming an image by employing an image forming apparatus based on image data acquired by applying a rendering operation to depiction commands, which are derived from input data written in a Page Description Language, the method comprising:

storing information including a flag indicating a type of operation to be applied by a hardware processing unit or a software processing unit based on a processing ability of the hardware processing unit or the software processing unit;

parsing the input data written in the Page Description Language so as to convert the input data to the depiction commands;

reading the information in regard to the depiction commands from the image forming apparatus;

determining whether the hardware processing unit or the software processing unit should apply the rendering operation to the depiction commands, based on the information above-read in regard to the depiction commands; and employing above-determined one of the hardware processing unit and the software processing unit for applying the rendering operation to the depiction commands.

* * * * *